United States Patent [19]

Yoshida

[11] Patent Number: 4,512,644

[45] Date of Patent: Apr. 23, 1985

[54] FLASH DEVICE

[75] Inventor: Masaaki Yoshida, Tokyo, Japan

[73] Assignee: Canon Kabushiki Kaisha, Tokyo, Japan

[21] Appl. No.: 573,369

[22] Filed: Jan. 24, 1984

[30] Foreign Application Priority Data

Jan. 31, 1983 [JP] Japan .................................. 58-15338

[51] Int. Cl.³ ............................................ G03B 15/05
[52] U.S. Cl. .................................................. 354/149.1
[58] Field of Search ...................................... 354/149.1

[56] References Cited

U.S. PATENT DOCUMENTS 4,078,240  3/1978  Kaneko et al. .................... 354/149.1
4,423,940  1/1984  Kashihara et al. ............... 354/149.1

Primary Examiner—Russell E. Adams
Attorney, Agent, or Firm—Toren, McGeady and Stanger

[57] ABSTRACT

In the disclosed flash device, a flash portion is shiftable from an ordinary flash position to a bounce flash position. Automatically controlling the illuminating angle of the flash portion on the basis of the focal length of the lens of the camera can degrade the effect of the flash photography. This is obviated by controlling the illuminating angle for bounce flash independent of the information on the focal length of the lens.

10 Claims, 6 Drawing Figures

FLASH DEVICE

BACKGROUND OF THE INVENTION

1. Field of the Invention

This invention relates to a flash device and more particularly to a flash device arranged to control the illuminating angle on the basis of information on the focal length of a photo-taking lens.

2. Description of the Prior Art

Flash devices of the type arranged to automatically control the illuminating angle of the flash on the basis of information concerning the focal length of the lens use illuminating angle varying means which may be disposed in front of a flash discharge tube. An example of a device is disclosed in Japanese Laid-Open Patent Application No. SHO 48-52226.

To carry out bounce flash photography with a flash device of the above-stated type, the flash of light is projected on a ceiling or a wall to illuminate the photographic object by the reflected light thus obtained from the ceiling or the wall. For bounce flash the light should be diffused all over the room or the whole photographic field. The illuminating angle to the reflecting surface is preferably set wide instead of narrow. However, if a lens of long focal length is to be used for bounce flash photography with a flash device of the above-stated type, the illuminating angle would be narrow. The use of a lens of long focal length for bounce flash photography thus causes inconvenience.

SUMMARY OF THE INVENTION

This invention is directed to the solution of the above-stated problem. It is therefore an object of the invention to provide a flash device which is of the above-stated type and is capable of solving the problem of the prior art with the device arranged to include a flash portion which is rotatably carried by a body portion of the flash device in combination with a sensor member which senses the turned position of the flash portion relative to the body portion and operates to inhibit illuminating angle control on the basis of the aforementioned focal length information when the flash portion is brought to a bounce flash photographing position by turning it to an extent more than a predetermined angle relative to the body portion.

It is another object of the invention to provide a flash device which is capable of automatically setting the illuminating angle of a flash portion for bounce flash photography and by forcedly shifting the illuminating angle from an angular position set for normal photography to an angular position for bounce flash photography when the flashing part is shifted to a bounce flash photographing position.

These and further objects and features of the invention will become apparent from the following detailed description of the preferred embodiments thereof taken in connection with the accompanying drawings.

DETAILED DESCRIPTION OF THE PREFERRED EMBODIMENTS

Figure 1:
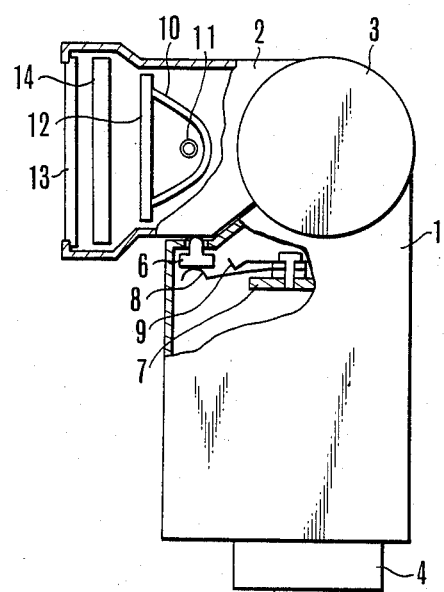
FIG. 1 is a partly cutaway side view showing a flash device as an embodiment of the present invention.

Referring to FIG. 1 which shows a flash device as an embodiment of the present invention, the embodiment includes a flash device body 1 and a flashing part 2 which is rotatably arranged on the body 1 together with a turning part 3. A foot part 4 in the lower part of the body 1 is secured to a camera. The electric circuit of the camera and that of the flash device body 1 are interconnected by terminals 5. The body 1 is provided with a push button 6 which serves as sensor member for detecting a change in the illuminating direction of the flashing part 2. The push button 6 is arranged in combination with an on-off switch 7 which serves as signal forming means for forming a bounce flash photography signal and is composed of electric contact pieces 8 and 9 with the push button 6 arranged to abut on the contact piece 8. The flashing part 2 includes a reflector shade 10, discharge tube 11, optical pannels 12 and 13 and illuminating angle varying means 14. The illuminating angle varying means 14 varies the illuminating angle of a flash of light in accordance with information on the focal length of a photo-taking lens received from the camera. Under a normal photographing condition, the flashing part 2 is in a position as shown in FIG. 1 (a normal photographing position). Under that condition, the photographing direction of the camera coincides with the illuminating direction of the flashing part 2. With the flashing part 2 in this position, the push button 6 is depressed to keep the electric contact pieces 8 and 9 of the on-off switch 7 in a switched off state. Further, the illuminating angle varying means 14 is arranged to have its flash illuminating angle controlled by information on the focal length of the photo-taking lens coming from the camera.

Figure 2:
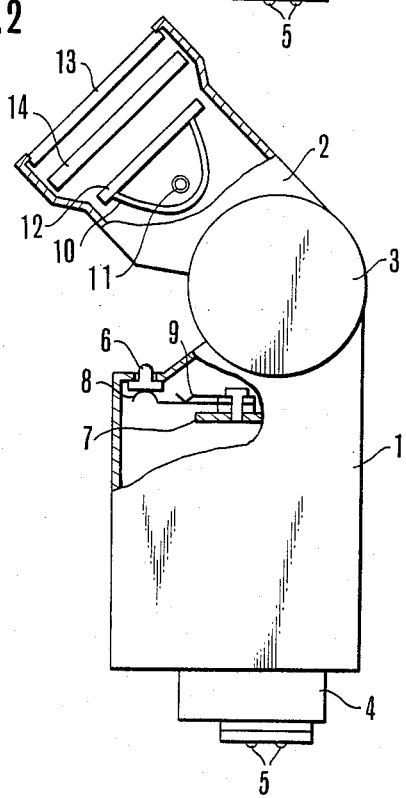
FIG. 2 is a partly cutaway side view showing the flash device of FIG. 1 as in a different state.

FIG. 2 shows the same embodiment as in a different state. In carrying out bounce flash photography, the flashing part 2 is turned by the photographer together with the turning part 3. Then, the illuminating direction of the flashing part 2 changes with the turning part 3 which allows the flashing part 2 to shift from the position of FIG. 1 to a position shown in FIG. 2, i.e. a bounce flash photographing position which obtains with the flashing part turned from an ordinary photographing position to an extent more than a predetermined angle. The flashing part 2 then releases the push button 6 from a depressed state to keep thereby the electric contact pieces 8 and 9 of the on-off switch 7 in a switched-on state. Therefore, the illuminating angle varying means 14 is controlled and adjusted to a predetermined flash illuminating angle independent of the information on the focal length of the photo-taking lens of the camera.

Figure 3:
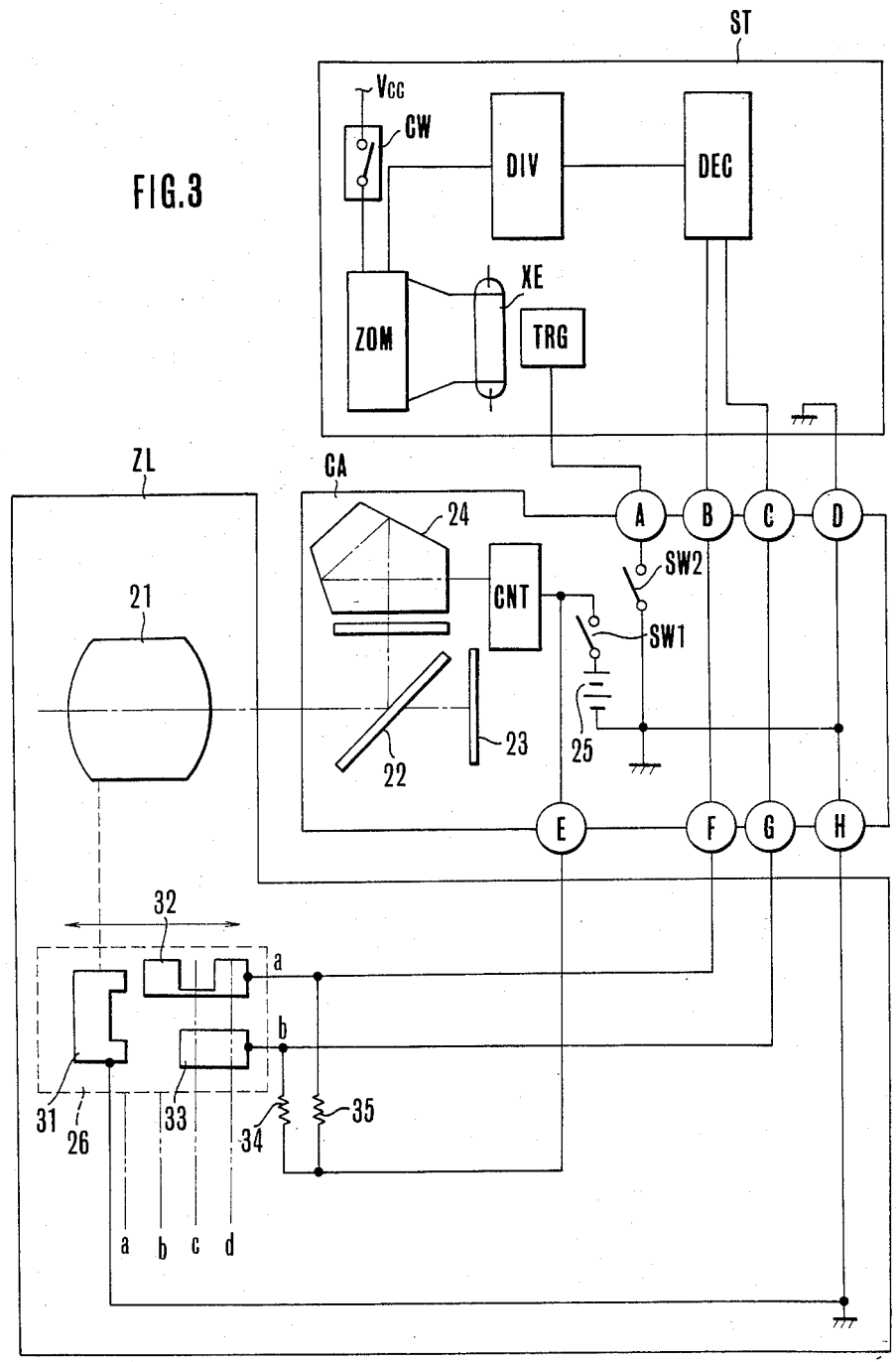
FIG. 3 is a block diagram showing a camera system including the flash device according to the invention.

FIG. 3 shows in a block diagram a camera system including the flash device according to the invention. The camera system includes a camera CA. The camera CA comprises a moving mirror 22 which is arranged to ascend from the position shown in FIG. 3 in response to a shutter release operation and thus comes to block an optical path leading to a pentagonal prism during an exposure to allow a film surface to be irradiated with light; and a control circuit CNT which operates with a voltage supplied from a power source 25 when a switch SW1 closes in response to a first stroke of a shutter releasing operation. Another switch SW2 is a known synchronizing switch arranged to operate in association with a shutter curtain or the like.

A reference symbol ZL denotes a zoom lens assembly which is arranged to be mounted on the camera CA. The zoom lens assembly ZL includes a photo-taking lens 21 and a focal length detection circuit 26. The focal length detection circuit 26 consists of a sliding contact piece 31 and fixed contact pieces 32 and 33 in this specific embodiment. The sliding contact piece 31 is fixedly attached to a movable part which is provided for setting a zoomed state of the zoom lens assembly and is also grounded. The fixed contact pieces 32 and 33 are formed into shapes as shown and are connected to the power source 25 of the camera via a contact E arranged between the camera and the zoom lens assembly ZL. The fixed contact pieces 32 and 33 are further connected to contacts B and C disposed on the side of the flash device via contacts F and G respectively.

A symbol ST denotes the flash device to be mounted on the camera CA. The flash device ST consists of a flash tube XE; a trigger circuit TRG which causes the flash tube XE to emit a flash of light when a synchronizing switch turns on; a switch CW which corresponds to the on-off switch 7 and turns on or off in response to a bounce flash photographing operation; a decoder DEC which is arranged to convert a focal length signal; and a driver DIV which is arranged to drive an illuminating angle varying part ZOM according to a signal produced from the decoder DEC.

Terminals A, B, C and D are arranged to connect the flash device ST to the camera CA. Terminals E, F, G and H are arranged to connect the zoom lens assembly ZL to the camera CA. The detailed arrangement of the flash device ST of FIG. 3 is as shown in FIG. 4.

Figure 4:
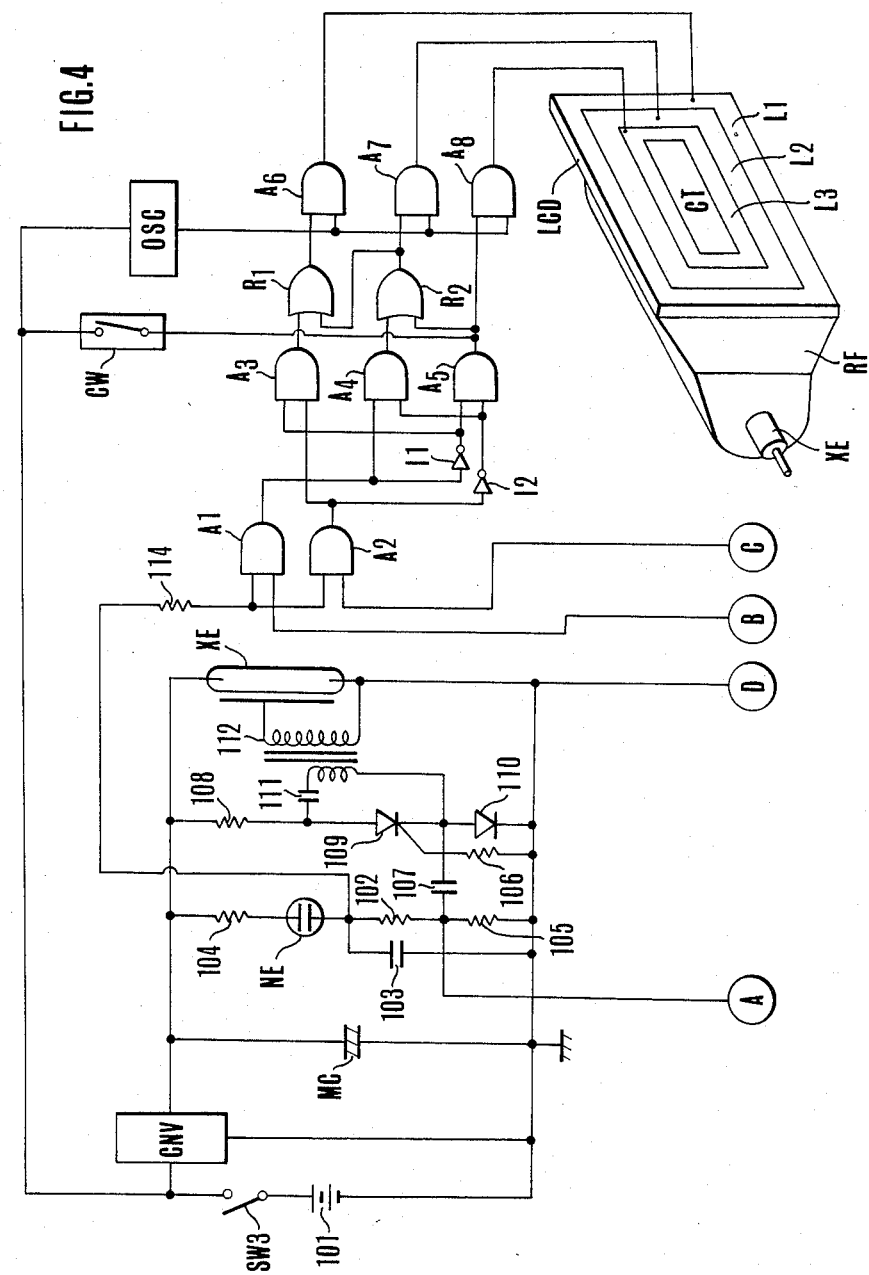
FIG. 4 is a circuit diagram showing by way of example the circuit arrangement of the flash device according to the invention.

Referring to FIG. 4 which is a circuit diagram showing by way of example the circuit arrangement of the flash device, the circuit includes a battery 101 which is arranged to serve as power source. The voltage of the power source is impressed via a main switch SW 3 on a high voltage DC converter CNV and a oscillator OSC which is arranged to impress an alternating voltage on a liquid crystal. The output of the high voltage DC converter CNV is supplied to a main capacitor MC. A series circuit which consists of a resistor 104, a neon tube NE, a resistor 102 and another resistor 105 is a detection circuit arranged to detect the charge voltage of the main capacitor MC. One end of the resistor 105 of the detection circuit is connected via a capacitor 107 to the cathode of a thyristor 109 and is also connected to the terminal A arranged between the camera and the flash device. The thyristor 109 forms a trigger circuit. The anode of the thyristor 109 is connected via a resistor 108 to the main capacitor MC while the cathode thereof is connected to a trigger capacitor 111 via the primary winding of a trigger transformer 112. Further, the gate of the thyristor 109 is connected to a resistor 106. The flash tube XE is a known flash discharge tube having the electrode thereof connected to the main capacitor MC and the trigger electrode thereof to the secondary winding of the above-stated trigger transformer 112.

One end of the neon tube NE is connected via a resistor 114 to one of the input terminals of each of AND circuits A1 and A2. Meanwhile, other input terminals of the AND circuits A1 and A2 are respectively connected to the terminals B and C arranged between the camera and the flash device. The output terminals of the AND circuits A1 and A2 are connected via inverters I1 and I2 to the input terminals of an AND circuit A5. An AND circuit A4 has the output terminal of the AND circuit A1 and that of the inverter I2 connected to the input terminals thereof. Another AND circuit A3 has the output terminal of the AND circuit A2 and that of the inverter I1 connected to the input terminals thereof. The output terminal of the AND circuit A5 is connected to an input terminal of an AND circuit A8 and that of an OR circuit R2. The OR circuit R2 also has the output terminal of the AND circuit A4 connected thereto. Another OR circuit R1 has the output terminal of the AND circuit A3 and that of the OR circuit R2 connected thereto respectively.

The output terminals of the OR circuits R1 and R2 are connected to the input terminals of AND circuits A6 and A7. Meanwhile, the output terminal of the oscillator OSC is connected to other input terminals of the AND circuits A6, A7 and A8. The output terminals of the AND circuits A6, A7 and A8 are respectively connected to liquid crystal blocks L1, L2 and L3. These AND circuits A1–A5, the OR circuits R1 and R2 and the inverters I1 and I2 constitute an illuminating angle control circuit. Meanwhile, the AND circuits A6–A8 constitute a driver circuit for the liquid crystal blocks which are arranged to serve as an illuminating angle varying part. Further, a power source voltage is arranged to be impressed via a switch CW on the output terminal of the AND circuit A5. A reference symbol RF denotes a reflector shade. Next, the operation of the embodiment shown in FIG. 3 will be described with reference to FIG. 4 as follows:

First, the operation of the embodiment under the normal photographing condition as shown in FIG. 1 is as follows: In this instance, the on-off switch 7 or CW is off. After the zoom lens assembly ZL and the flash device ST are mounted on the camera CA, when the power switch SW3 of the flash device is turned on, the main capacitor MC begins to be charged via the high voltage DC converter CNV. When a voltage required for lighting up the neon tube NE is reached, the neon tube NE lights up and a voltage is produced at two terminals of the resistor 105. The capacitor 107 and also another capacitor 103 are charged. A signal of a high level (hereinafter will be called HL) is then applied to the input terminals of the AND circuits A1 and A2. Following that, when the switch SW1 is turned on by a release operation on the camera, the power source battery of the camera causes the control part CNT of the camera to operate. Then, the voltage of the battery 25 is impressed on the resistors 34 and 35 via the terminal E arranged between the camera and the zoom lens assembly. At that instant, if the movable part of the zoom lens assembly is located at a two-dot chain line part c, the sliding contact piece 31 is connected to the fixed contact piece 33. This causes the contact piece 33 to be grounded. Therefore, the level of the terminal G which is connected to the contact piece 33 becomes a low level (hereinafter will be called LL for short). Then, since another fixed contact piece 32 is not in contact with the sliding contact piece, the level of the terminal F which is connected to the fixed contact piece 32 becomes HL.

Therefore, the circuit 26 produces a focal length signal in the form of an HL output "a" and an LL output "b" according to the zooming state set by the movable part which is provided for the purpose of setting a zooming state of the zoom lens assembly. This focal length signal is applied to other input terminals of the AND circuits A1 and A2 via the terminals F and G between the camera and the zoom lens and the terminals B and C between the camera and the flash device. Then, since only the terminals F and B are at HL, the AND circuit A1 alone produces an output. In other words, the output level of the AND circuit A1 is HL while that of the AND circuit A2 is LL. Accordingly, the levels of both input terminals of the AND circuit A4 become HL. The AND circuit A4, therefore, produces an HL output. The output of the AND circuit A4 is produced via the OR circuits R2 and R1. Accordingly, one of the input terminals of each of the AND circuits A6 and A7 comes to have an HL input. At that time, since the alternating voltage produced from the oscillator OSC is applied to other input terminals of the AND circuits A6 and A7, the AND circuits A6 and A7 also produce their outputs at the same frequency. As a result, a voltage is impressed on the blocks L1 and L2 of the liquid crystal LCD is change them into a semi-transparent substance. Meanwhile, the middle parts CT and the block L3 of the liquid crystal become transparent. With the liquid crystal blocks changed in this manner, the illuminating angle is controlled by the focal length signal corresponding to the zooming state set by the movable part.

Under this condition, when the release operation is further performed (to the second stroke thereof), the movable mirror 22 moves upward. The leading curtain of the shutter travels to begin to expose the film surface 23 to light. The switch SW2 closes in response to the travel of the leading curtain of the shutter. The terminal A is, therefore, grounded. This causes the electric charge of the capacitor 107 to be discharged through the resistor 106 and the gate and cathode of the thyristor 109. The thyristor 109, therefore, turns on to cause the capacitor 111 which has been charged to discharge its electric charge via the primary side of the trigger transformer 112. The secondary side of the trigger transformer 112 then produces a high voltage to excite and cause the flash tube XE to flash.

At that instant, as mentioned in the foregoing, the illuminating angle varying part ZOM disposed in front of the flashing part has its illuminating angle restricted by the liquid crystal blocks L1 and L2 and is at an illuminating angle corresponding to the zooming state set at the zoom lens. Therefore, a flash of light is emitted at the illuminating angle corresponding to the zoomed state of the zoom lens. Further, in case that the sliding contact piece which is responsive to the movable part of the zoom lens is at a point "a" which is shown in FIG. 3, no voltage is impressed on the liquid crystal LCD and the liquid crystal blocks L1–L3 are left in their transparent states to give the narrowest angle. With the sliding contact piece at a point "b", only the block L1 becomes semi-transparent. With the sliding piece at another point "d", all the blocks L1, L2 and L3 become semi-transparent and the middle part CT alone becomes transparent to give the widest angle. Therefore, the sliding piece 31 is arranged to be at the point "a" of FIG. 3 when the movable part of the zoom lens is located at the longest focal length point and to be at the point "d" of FIG. 3 when the movable part is located at the shortest focal length point. This arrangement permits flash photographing operations to be carried out always at the illuminating angle corresponding to the zoomed state of the zoom lens.

With the movable part shifted according to the focal length of the zoom lens as mentioned above, the area of a flash of light emission part in front of the reflector shade of the flash device is varied by means of the liquid crystal to change the illuminating angle accordingly.

When the embodiment is brought into a bounce flash photographing state by shifting the flashing part to the bounce flash photographing position as shown in FIG. 2, the on-off switch CW turns on. Therefore, in this case, an HL output is produced as a bounce flash photographing signal and is supplied to the AND circuit A8. The signal is supplied also to the OR circuit R2. As a result, the OR circuits R1 and R2 produce HL outputs, which are supplied to the AND circuits A6 and A7. Accordingly, all the liquid crystal blocks L1–L3 become semi-transparent. Therefore, distribution of light can be effected on the widest angle side whatever the zoomed state (focal length) of the zoom lens may be. In this particular embodiment, the switch CW is connected to the output terminal of the AND circuit A5. However, instead of this arrangement, a switch which operates reversely to the above-stated on-off switch CW and turns off when the flashing part is shifted to the bounce flash photographing position may be arranged between the neon tube NE and the resistor 114. Such modification likewise enables to always obtain light distribution on the widest angle side in the case of bounce flash photography.

Figure 5:
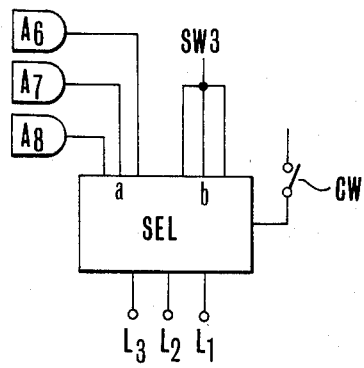
FIG. 5 is a circuit diagram showing an illuminating angle control circuit arranged in the circuit of FIG. 4 as another example.

Further, referring to FIG. 5, in another modification, a data selector SEL is arranged to have input terminals "a" connected to the AND circuits A6–A8 of FIG. 4 and input terminals "b" connected to three signal lines which are connected to the switch SW3. Meanwhile, the above-stated switch CW is connected to the selector SEL instead of being connected to the output terminal of the AND circuit A5 as shown in FIG. 4. In the case of this modification, a signal is produced at the input terminals "a" for ordinary photographing. In the event of bounce flash photographing, a signal is produced to the input terminals "b" when the switch CW turns on, so that the illuminating angle likewise can be always controlled on the wider angle side for bounce flash photography. Further, if the signal lines connected to the input terminals "b" of the selector SEL are arranged to carry different signals respectively, the illuminating angle can be controlled to become an angle other than the widest angle at the time of bounce flash photography.

Figure 6:
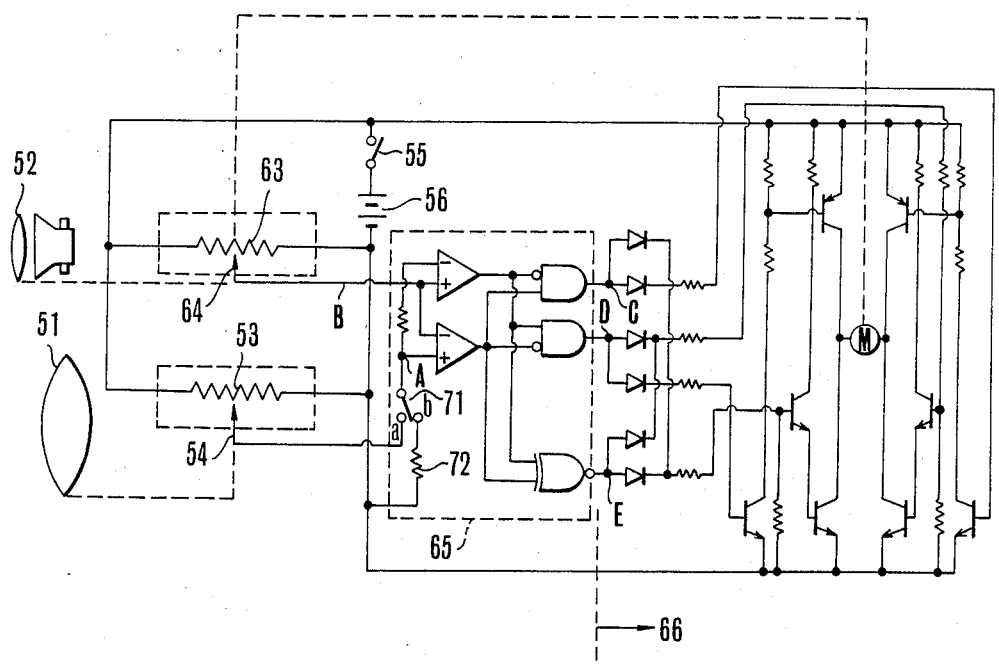
FIG. 6 is a circuit diagram showing an illuminating angle varying part arranged in the circuit of FIG. 4 as another example.

FIG. 6 is a circuit diagram showing another embodiment of the invention in which, instead of the illuminating angle varying part consisting of the liquid crystal blocks of the embodiment described in the foregoing, the illuminating angle is arranged to be variable by shifting back and forth an optical pannel disposed in front of a flashing part. Referring to FIG. 6, the circuit diagram includes a zoom lens 51; a focal length detection circuit 53; a sliding contact piece 54 of the focal length detection circuit 53; an illuminating angle varying head position detector 63; a sliding contact piece 64 of the head position detector 63, the sliding position thereof being arranged to be determined by the position of the pannel 52; a comparison circuit 64 which compares a voltage signal produced from the focal length detection circuit 53 with a voltage signal produced from the head position detector 63; a motor driving circuit 66 which is arranged to cause a motor M to rotate forward or backward or to stop according to the output of the comparison circuit 64; a switch 71 which operates according as the embodiment shifts between the ordinary photographing state and the bounce flash photographing state; and a resistor 72. The switch 71 is responsive to the flashing part shown in FIGS. 1 and 2. The switch 71 is on one side "a" thereof when the flashing part is in the normal photographing position shown in FIG. 1 and on the other side "b" when the flashing part is in the bounce flash photographing position shown in FIG. 2. In the normal photographing condition, the switch 71 is connected to the side "a". When power supply is effected from the power source 56 to the device by closing the power switch 55, the focal length detection circuit 53 and the head position detector 63 produce voltage signals respectively corresponding to the positions of the sliding contact piece 54 of the focal length detection circuit and the sliding contact piece 64 of the head position detector. These voltage signals are supplied to the comparison circuit 65. The comparison circuit 65 compares the voltage signal A from the focal length detection circuit 53 and the voltage signal B from the head position detector 63.

The contact piece of the detector 63 slides according to the position of the pannel 52 as mentioned in the foregoing. Therefore, the output B of the detector 63 represents a value corresponding to the position of the pannel 52. Meanwhile, the sliding contact piece 54 is arranged to be responsive to the movable member which is provided for setting the zoomed state of the zoom lens. Therefore, the output A of the detection circuit 53 represents a value corresponding to the set zoomed state of the zoom lens. The comparison circuit 65 is arranged to produce an HL output from an output terminal C when the result of comparison is A>B, to produce an HL output from an output terminal D when the result of comparison is A<B and to produce an HL output from another output terminal E thereof when the result of comparison is A=B. The motor driving circuit 66 is arranged to cause the motor to rotate forward when the output level of the output terminal D is HL, to rotate backward when the output level of the output terminal C is HL and to stop when the output level of the output terminal E is HL.

Therefore, the motor M is operated according to the result of comparison performed by the comparison circuit 65. With the motor M thus rotated, the pannel 52 is shifted to a position corresponding to the set zoomed state of the zoom lens. Then, flash photographing is performed at an illuminating angle corresponding to the focal length of the zoom lens.

In the case of bounce flash photography, the flashing part is shifted to the bounce flash photographing position. This shift of the flashing part switches the switch 71 from the side "a" over to the other side "b" thereof. Then, a ground potential is impressed as the above-stated voltage signal A on the comparison circuit 65. The circuit 65 then produces an HL output from its output terminal D to cause the motor to rotate forward. The pannel 52, therefore, shifts to a position to give the widest illuminating angle. The illuminating angle is thus set for bounce flash photography independent of the focal length of the zoom lens.

In accordance with the invention, as described in the foregoing, the illuminating angle control operation on the basis of focal length information is inhibited by the shift of the flashing part to a bounce flash photographing position. Therefore, the flash device according to the invention always permits appropriate bounce flash photography.

In the embodiment described, a push button provided on the camera body is used as a sensor member. This arrangement, however, may be replaced with another arrangement in which: Switching means is provided within the turning part 3 shown in FIGS. 1 and 2 for detecting the turned angle of the turning part and is arranged to give a bounce flash photographing signal when the turning part turns to an extent exceeding a predetermined angle from the normal state thereof.

Further, in the case of the embodiment described, a zoom lens is used for the camera. However, the invention is likewise applicable to an ordinary lens if the lens is provided with a focal length information source to permit control over the illuminating angle on the basis of the information from the information source. Such a lens is of course usable as interchangeable lens in accordance with the invention.

Further, the embodiment described is arranged to automatically adjust the illuminating angle to a value corresponding to the focal length. However, the invention is applicable not only to a flash device of that type but also to a device of the type manually adjusting the illuminating angle in an ordinary photographing position. In that instance, the illuminating angle may be arranged to be automatically shifted from a manually set state to an illuminating angle suited for bounce flash photography.

What I claim:

1. A flash device for a camera having a flash part arranged to be shiftable from an ordinary photographic position for bounce flash photography, comprising:
    (a) input means for receiving information on the focal length of a photo-taking lens;
    (b) illuminating angle adjusting means for adjusting the illuminating angle of a flash of light to be emitted from said flash part according to the focal length information obtained through input means; and
    (c) control means for supplying, in the case of bounce flash photography, said illuminating angle adjusting means with predetermined illuminating angle information in place of said focal length information.

2. A flash device for a camera having a flash part arranged to be shiftable from an ordinary photographic position to a bounce photographic position for bounce flash photography, comprising:
    (a) input means for receiving information on the focal length of a photo-taking lens;
    (b) illuminating angle adjusting means for adjusting the illuminating angle of a flash of light to be emitted from said flash part according to the focal length information obtained through said input means; and
    (c) inhibiting means for inhibiting, in the case of bounce flash photography, said illuminating angle adjusting means from controlling the illuminating angle on the basis of said focal length information.

3. A flash device for a camera having a flash part arranged to be shiftable from an ordinary photographic position to a bounce flash photographic position for bounce flash photography, comprising:
    (a) illuminating angle adjusting means coupled with means for producing information on the focal length of a photo-taking lens for adjusting, on the basis of focal length information, the illuminating angle of a flash of light to be emitted from said flashing part; and
(b) restricting means for uncoupling said illuminating angle adjusting means from said focal length information producing means and for restricting the illuminating angle to a predetermined value for bounce flash photography when said flash part is in said bounce flash photographic position.

4. A flash device for a camera having a flash part arranged to be shiftable from an ordinary photographic position to a bounce flash photographing position for bounce flash photography, comprising:
(a) illuminating angle adjusting means which is coupled with means for receiving information on the focal length of a photo-taking lens for adjusting, on the basis of said focal length information, the illuminating angle of a flash of light to be emitted from said flashing part; and
(b) releasing means for uncoupling said illuminating angle adjusting means from said focal length information producing means when said flash part is in said bounce flash photographing position.

5. A camera system comprising:
(A) a camera including focal length information producing means for producing information on the focal length of a photo-taking lens; and
(B) a flash device having a flash part shiftable from an ordinary photographic position to a bounce flash photographing position, the flash device including:
(a) illuminating angle adjusting means for adjusting the illuminating angle of a flash of light to be emitted from said flash part on the basis of the focal length information produced from said focal length information producing means; and
(b) control means for supplying, in the case of bounce flash photography, said illuminating angle adjusting means with predetermined illuminating angle information in place of said focal length information.

6. A camera system comprising:
(A) a camera including focal length information producing means for producing information on the focal length of a photo-taking lens; and
(B) a flash device for a flash part shiftable from an ordinary photographic position to a bounce flash photographic position, the flash device including,
(a) illuminating angle adjusting means for adjusting the illuminating angle of a flash of light to be emitted from said flash part on the basis of the focal length information produced from focal length information producing means; and
(b) inhibiting means for inhibiting, in the case of bounce flash photography, said illuminating angle adjusting means from controlling the illuminating angle on the basis of said focal length information.

7. A flash device for a camera having a flash part arranged to be shiftable from an ordinary photographic position to a bounce flash photographing position for bounce flash photography, comprising:
(a) illuminating angle control means for adjusting the illuminating angle of a flash of light to be emitted from said flash part to a predetermined angle for bounce flash photography; and
(b) means for causing said illuminating angle control means to respond to a shift of said flash part from the ordinary photographic position to the bounce flash photographic position.

8. A flash device comprising:
(a) a flash part arranged to be shiftable from an ordinary photographic position to a bounce flash photographing position; and
(b) adjusting means for adjusting the illuminating angle of a flash of light to be emitted from said flash part, said adjusting means being arranged to adjust the illuminating angle to a predetermined illuminating angle when said flashing part is shifted to said bounce flash photographic position.

9. A flash device for a camera having a flash part shiftable from an ordinary photographic position for bounce flash photography, comprising:
(a) illuminating angle adjusting means for adjusting the illuminating angle of a flash of light to be emitted from said flash part; and
(b) control means responsive to a shift in said flash part from the ordinary photographing position to the bounce flash photographic position for shifting the illuminating angle adjustment performed by said illuminating angle adjusting means from an illuminating angle for ordinary photography to an illuminating angle for bounce flash photography.

10. A flash device for a camera having a flash part shiftable from an ordinary photographic position to a bounce flash photographic position for bounce flash photography, comprising:
(a) illuminating angle adjusting means for adjusting the illuminating angle of a flash of light to be emitted from said flash part; and
(b) control means, responsive to a shift of said flash part from the ordinary photographing position to the bounce flash photographing position, for shifting the illuminating angle to an angle for bounce flash photography independent of the illuminating angle adjustment performed by said illuminating angle adjusting means for ordinary photography.

* * * * *